Figure 1:
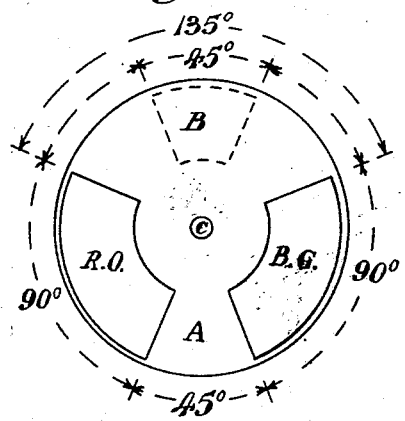

H. W. JOY.
COLOR CINEMATOGRAPHY.
APPLICATION FILED NOV. 9, 1915.

Patented Oct. 24, 1916.

Inventor—
Henry William Joy

UNITED STATES PATENT OFFICE.

HENRY WILLIAM JOY, OF HAMPTON-UPON-THAMES, ENGLAND, ASSIGNOR TO CHARLES URBAN, OF NEW YORK, N. Y.

COLOR CINEMATOGRAPHY.

1,202,724.  Specification of Letters Patent.  Patented Oct. 24, 1916.

Application filed November 9, 1915. Serial No. 60,559.

*To all whom it may concern:*

Be it known that I, HENRY WILLIAM JOY, residing at Hampton-upon-Thames, Middlesex, England, have invented certain new and useful Improvements in and Relating to Color Cinematography; and I do hereby declare the following to be a full, clear, and exact description of the invention, such as will enable others skilled in the art to which it appertains to make and use the same.

This invention relates to improvements in color cinematography.

In order to produce cinematograph pictures which on projection give the observer the impression of color it has hitherto been the practice to photograph the subject through a series of two or three color screens in such a manner that successive pictures on the film represent the respective color components of the subject corresponding to the particular screen through which they were photographed. From the negative thus obtained a positive is printed and projected through similar color screens, care being taken that pictures taken through a particular color filter are projected through a similar one. By rapid projection the effect of superimposition and blending of the two or more differently colored component pictures of the subject is produced, which give the observer the illusion of the moving pictures being in approximately natural colors. It has also been proposed to use a screen of one color only and to take and project pictures alternately through this screen and by white light, thus taking advantage of the "complementary color illusion" whereby the picture taken and projected by white light will appear to the observer to be of the color complementary to that of the picture taken and projected through the colored screen, if projection be sufficiently rapid. In this method also the effect of superimposition and blending of the two images is used to produce the effect of natural colors.

It follows from the above that whichever of the processes described be used, either two or more separate pictures or exposures are required in order to produce one complete colored image or color cycle in the observer's eye. While these exposures are being made, the subject being photographed is in most cases moving, thus the two or more exposures necessary for the production of one color cycle will not coincide with each other, as the subject will have moved between each exposure, and the effect of this method of operation has been the frequent occurrence of what is known as color lapping or fringing, which means that a moving object instead of appearing in natural colors, appears alternately in the several colors used in the color screen. This has in the past resulted in severe eye-strain to the observer.

The object of the present invention is to remove this disadvantage as well as others, and to provide several other improvements and advantages in color cinematography.

With these ends in view the principal feature of the invention consists in a process for obtaining animated color cinematograph pictures characterized by employing a single lens camera of Maltese cross, single pin or allied type having a regular feed in which means are provided for placing the exposures of a group or cycle as close as possible, and in which the maximum masking effect is provided between the ending color filter of one cycle or group and the beginning color filter of the next cycle combined with means as hereinafter described, such that on projecting compensation is given according to the color persistence value of the individual exposures.

The invention is carried out as follows:— In the taking of the negative I arrange the exposures necessary for obtaining a complete color cycle, in groups, in such a manner that the smallest possible interval of time elapses between the successive exposures of each group, and I correspondingly increase the length of time during which the film is obscured between successive groups. In this manner the displacement of the subject due to its motion between the individual exposures of each color cycle or group is reduced to a minimum. By the term "color cycle" or "group" is meant the number of exposures necessary to obtain on projection one complete image in approximately natural colors in the observer's eye. Consequently on projection I obtain better superimposition and blending of the several colored images of each group.

A further advantage of the invention is that as almost complete superimposition of the individual pictures forming each cycle or group of color records is obtained, it is possible to increase the length of time elapsing between the last exposure of one cycle or group and the first exposure of the succeeding one without impairing the total motion effect of the projected pictures, the reason being that the mind through the human eye receives color differences with greater readiness than object movements in color accord. Hence greater liberty can be taken with differences of object movement, but fringing must not occur or must be eliminated as far as possible. The result of this is that it is possible successfully to record any given subject in color and motion with a smaller number of total exposures than has hitherto been the case, and consequently a shorter length of film is required for any given subject. This advantage of the invention can be explained in other words as follows:—As the motion of the subject between the individual exposures of each cycle or group is reduced to a minimum, the result of projection will be that a clearer image in color will be conveyed to the observer during each cycle as better superimposition will be obtained. Consequently the subject may be allowed to move a greater distance between the commencement of the next successive exposures without impairing the total motion effect than has hitherto been the case.

In the preferred form of carrying out my invention, I employ a circular color screen synchronously geared to the film driving mechanism, and revolving either in front of the lens or lenses, or between these and the film. This color screen is divided into segments containing the transparent materials to act as color filters, and the non-transparent material for the purpose of obscuring the film. The non-transparent segment or segments situated between the individual color filters belonging to one group or color cycle, are of the smallest possible dimensions, and the non-transparent segment between the color filter taking the last exposure of one group and that taking the first of the succeeding one is correspondingly increased. The actual angle of the reduced non-transparent segment or segments depends on the mechanism of the camera or projector, and on the rapidity with which the film is capable of traveling. In practice I find that for ordinary use, satisfactory results are obtained if the angle of the reduced segment is approximately 45 degrees, using a Maltese cross feed mechanism of known type.

For the purposes of the invention I employ a uniform intermittent film motion, and by enlarging that segment of the color screen which obscures the film between successive groups, I over-cover the change period of the film between the groups. On the other hand, the individual exposures of each group are made as rapidly as the photographic speed of a panchromatic film will allow.

According to the invention, however, a different arrangement of the color screen is used for projecting. In this case the colored portions of the screen may be so arranged as to compensate for the differences in time required for the different colors to be retained by the observer's eye in such a way as to obtain perfect fusion or color harmony.

It is well known that the speed of recognition of colors by the eye varies according to their position in the visible spectrum, and in projecting according to this invention, these differences may be allowed for by varying the period of exposure through the several color screens, but at the same time reducing the period between the individual exposures of each group or cycle to its minimum.

It will be understood that should the various color projections forming one complete cycle of color be projected in the manner just described, the sum total of the respective colored light intensities must be so graded as to produce approximately white light upon the projecting screen, i. e. the process of producing a white light by adding colored lights, depends for its purity of white upon the correct proportioning of the several colored lights representing the component parts of the spectrum; this procedure is well known as the "additive" process.

I will, however, now proceed to describe this invention more particularly by reference to the accompanying drawings in which:—

Figure 2:
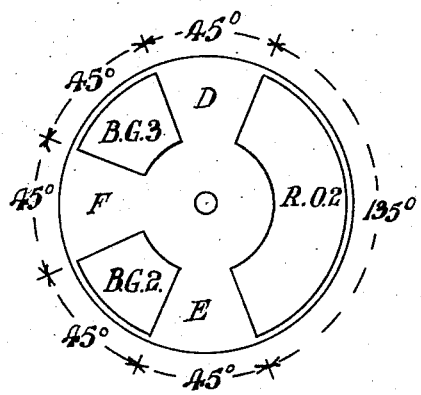
Figure 3:
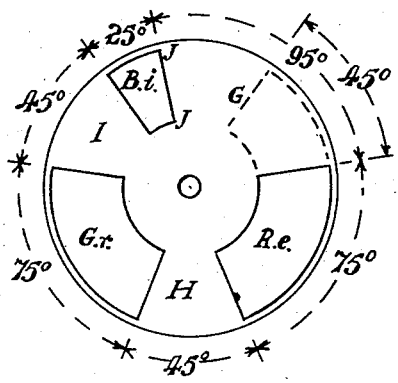
Figure 4:
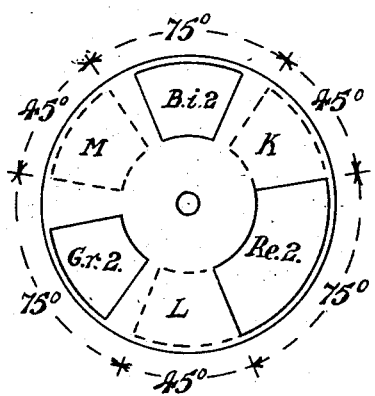

Figure 1 shows a suitable form of two color light filter disks for a camera whose exposure motion is of the known type of single pin Maltese cross action and in which a uniform intermittent movement of the film is obtained. Fig. 2 shows the preferred form of a two color filter disk for a Maltese cross projector of single pin type the said filter illustrated being that selected as best for producing the best color fusion on such type of machine. Fig. 3 shows a filter disk having a filter grouping for camera to be used in three of tricolor exposures, admitting the least possible masking between each exposure. Fig. 4 shows filter disk arranged for the projection of a 3-color positive with the three colored exposures of varying duration to allow for the retention values of the spectrum divisions according to the accepted co-efficients of color retention of the human eye.

Referring to the drawings, and to Fig. 1 which represents a two color light filter disk arranged to revolve upon the center C and synchronously with the film moving mechanism of the camera; it being understood that one complete revolution of the filter occurs for every two exposures made, such two exposures producing one complete representation of a scene in colors that in exhibition appear to approximate nature. In two-color work where two exposures only are required, it is customary to make one exposure through a red-orange filter, and the other through a blue-green filter, whose joint color values equal white light and whose individual color values are a near division of the spectrum. As the object of this invention is to make these two exposures as rapidly as possible within the shortest possible duration of time it is convenient to employ what is universally known as the single pin Maltese cross action, whereby a uniform intermittent movement is imparted to the film which gives a complete one picture displacement during the time occupied by revolving the double filter disk as illustrated in Fig. 1, through an arc of approximately 45°, as represented by the opaque portion A. The rate of changing the film during the period of obscuration by the opaque portion B is indicated by the dotted portion of B and is identical to A by reason of employing the single pin action referred to. The two light filters are represented in Fig. 1 as B. G. indicating blue-green and R. O. indicating red-orange each filter giving an approximate exposure of 90° respectively. The opaque portion, or shutter, A covers the change between the exposures during its travel of approximately 45°, thus leaving 135° to the opaque portion or shutter B. It will thus be noted that with the regular intermittent movement of the film the opaque portion B considerably overcovers the movement of the film when in the B phase; as it is assumed that the object being photographed is in rapid movement the result of using such a filter as a whole as Fig. 1 causes the exposures made through B. G. and R. O. to record as little dissimilarity of movement of the object as possible.

In practice, it is found that the light filtered portions B. G. and R. O. of Fig. 1 are of fairly correct proportions when using an ordinary panchromatic film, but should it be necessary to compensate for unequal panchromatic values of the film, B may be further extended in either the direction of R. O. or B. G. as may be required, or should it be necessary to lessen the exposures equally through both filters, B is extended to mask R. O. and B. G. equally.

The actual angle of the opaque portion B can only be found by empirical trial; no data can possibly be given, as when recording a cinematograph color picture to approximate nature the sensitiveness and panchromatic value of the unexposed film, and the intensity or color value of sun or artificial light by which the object photographed is illumined, must be taken into consideration, and allowed for as directed. Those skilled in the art will readily understand that the two filtered exposures must if necessary be adjusted to give an equal deposit in the negative, when photographing a white object. The essence of the invention when applied to the negative exposure is that the opaque or shutter portion A shall be kept as small as possible, or just sufficient to mask the movement of the film occurring between the light filtered exposures necessary to constitute one complete cycle of filtered exposures.

In projecting a two color positive film and in order to diminish color flicker or pulsation as far as possible, a color filter disk as illustrated in Fig. 2 is employed in conjunction with a known single pin Maltese cross machine. I have found it necessary to treat the projecting of a color cinematograph positive from a different standpoint to the taking or recording of the negative in the camera, for whereas a cinematograph camera is a mechanical means for recording motion and color value, the positive film should be so projected that same will conform with the requirements of human vision, which is a physiological qualification, that is to say not mechanical, and must be judged according to average vision.

As color harmony or fusion may be obtained by what is known as the persistence of vision method, i. e., the alternation of complementary lights rapidly projected upon a screen, so that one light only can be seen at any given moment, it is necessary to proportion the time of exposing each spectrum division, so that the eye shall retain each color impulse for a similar period. The non-observance of this phenomenon has hitherto produced extreme color flicker or pulsation which is very harmful to the observer. It is well known that the eye does not retain the red impression or sensation for so long a period as the blue sensation, consequently color flicker can be considerably diminished by projecting the red-orange positive for a longer period of time than the alternating blue-green positive, thus causing the color of the lowest persistency value, that is the red-orange positive, to persist until the same color recurs.

In Fig. 2 is illustrated the preferred arrangement for arranging the masking or opaque portions of the disk as shown at D and E of equal dimensions, each just sufficient to cover the period of changing the film. The blue-green filter is indicated by $B.G^2$ and $B.G^3$, while the red-orange filter is indicated by $R.O^2$. The blue-green filter is interrupted by an opaque portion F. The arrangement as set out in Fig. 2 is found to give the best color fusion, and gives the blue-green exposure approximately two-thirds the duration of the red-orange. In order to subdue light flicker it is not desirable in projecting 2 colors only to overmask the changing of the film. The light filters are selected of correct graduation so that the sum total of $B.G^2 + B.G^3 + R.O^2$ shall equal a near approximation to white upon rapid projection, the film for this purpose being omitted from the projector.

In practice the projection filter illustrated in Fig. 2 will give as long an exposure as possible to the red-orange portions of my positive film, through the filter $R.O^2$, while the blue-green portions are preferably projected twice in succession through $B.G^3$ and $B.G^2$ respectively. The opaque portion F simply lessens the total exposure of the blue-green, and may be so placed or divided to cut out any portion or portions of the blue-green filter.

It is to be understood that the angles shown in my drawings are not necessarily absolute. The essence of the invention as applied to two color projection is to provide a longer exposure for each individual red-orange picture, wholly, and of sufficient time to permit its being visibly maintained by the eye, so that such maintenance shall balance, or be equal to the longer retention by the eye, of the blue-green picture, notwithstanding the shortened time of visibility of the blue-green pictures.

It has hitherto, and in order to successfully photograph and project a cinematograph two color picture been necessary to make about 40 exposures per second for the purpose of avoiding color fringing or overlapping.

For general purposes, according to this invention two color pictures are taken and projected at a uniform rate of approximately 30 total exposures per second. In cases where movement of the object is of a slow nature, it is found that a speed of approximately 20 exposures per second is sufficient, but where it is required to photograph objects whose color is nearly or quite the same as that of the color filters employed in the camera, the higher speed is necessary, as it must be obvious that extremes of color will not harmonize at a slower speed than that required to produce color fusion by the persistence of vision method, as the eye will identify the individual colors.

In applying my invention to the recording of a color cinematograph picture wherein three exposures are required, through red, green and blue filters successively whose color sum total is white, a filter disk is employed grouping the exposures as set out in Fig. 3. Such a disk makes one complete revolution for every group of three exposures, and is geared to synchronize with the intermittent movement of the film. For convenience a known similar intermittent film moving device may be used as employed in taking and projecting the two color pictures. The disk Fig. 3 has three opaque or masking portions, G, H, I. The sector G is extended to approximately 95° which is actually 50° more than is necessary to cover the change of film as indicated by the dotted portion of G. In all tri-color work the sensitiveness of the film to blue-violet is approximately three times greater than the sensitiveness to red or green (which are generally equal). The object being to obtain a tri-color group of three exposures, red, green, and blue, with the shortest possible duration of time intervening, the shortest or blue exposure is arranged to follow its predecessor as rapidly as the mechanism of the camera will allow, and so obtain one complete three color cycle with as little dissimilarity of movement in the resultant negatives as is possible when using a known constant speed film moving device. The speed of Fig. 3 is required to be the same as Fig. 1, but as three exposures are required to be made, the film must obviously be fed $1\frac{1}{2}$ times the rate of a two color film.

For preference a panchromatic film is employed whose sensitiveness is equal as to red and green, the sector G being increased or decreased at J J according to the supersensitiveness of the film to the blue or blue-violet.

In projecting my three color positive I arrange my exposures as set out in Fig. 4 (see this figure). K, L, M. represent the opaque masking portions or shutters, of dimensions approximately as shown and when using the known film changing devices as already referred under Fig. 1. By over masking the periods of change the correct times of exposures are obtained through the $Re^2$, $Gr^2$, and $Bl^2$ filters respectively. The red exposure, as in Fig. 2, is as long as possible, the green exposure, is about $\frac{3}{4}$ of the red, and the blue is about two-thirds of the red, thus enabling the eye to retain each exposure for approximately the same period of time, so diminishing the effect of color pulsation, and giving a better harmonizing of the three colors to form a whole, than has hitherto been possible. In carrying out this invention in projection and referring to Fig. 4, three filters of the requisite intensities are selected to produce a white light upon projection without a film.

In general practice the best results have been obtained by employing the filter according to Fig. 1 for the purpose of recording a negative, and the filter according to Fig. 2 for the projection of the positive.

The terms "approximately natural colors" or "colors approximating nature" are not intended to convey that the colors of the projected picture are identical with or a correct color tone value of nature. In two color projection especially the persistency of the blue or violet groups of sensations always impart a different in depth, tone and color quality. The results obtained by the foregoing improvements are *inter alia* in the direction of eliminating the over-preponderance of the blue violet tones, and it is not intended that the picture projected in a darkened room should for the purposes of interpreting the term "approximately natural color" be compared with the actual scene or object in daylight. Further, the terms "filter" and "screen" are to be interpreted as interchangeable as regards their function in this specification, and the colors mentioned as used in the color filters for two and three color exposure and projection are those which are commonly employed for such purpose, and the invention is not intended to cover in its scope any particular color or combinations or spectrum divisions.

I claim:—

1. In the art of producing pictures in color of an object in motion, the method which consists in producing a succession of groups of successive colored light filtered exposures, masking the displacement of the film between the exposures forming one group and also between consecutive groups of exposures; the period of masking between successive pictures of each group being shortened as much as possible to approximately equal the time required to displace the exposed film by the unexposed film, and represent the object without material change in position, and the period of masking between consecutive groups being relatively long.

2. A process for obtaining animated pictures in color of an object in motion which consists in taking consecutively a number of groups of colored light filtered exposures on an intermittently moving film, each group containing a plurality of colored light filtered exposures of the requisite number to complete one complete color cycle or one complete picture representing a scene in natural colors, masking the film between all successive exposures, the period of masking between the successive exposures of each group being shortened as much as possible and approximately equal to the time required to displace the exposed film by the unexposed film and represent the object without material change in position, and the period of masking between the consecutive groups of exposure being the maximum permitted by the mechanical movement of the object being photographed to represent continuity of motion.

3. The art of producing pictures in color of an object in motion which consists in producing a succession of groups of successive colored light filtered exposures on a panchromatic film, masking the displacement of the film between successive exposures forming a group and also between consecutive groups; the period of masking between exposures of a group being shortened to approximately equal only the time required to displace the exposed film by the unexposed film and represent the object without material change in position, the period of masking between groups being relatively long; and in projecting positive prints of said negative exposures successively through successive color screens, the color values of which are varied to compensate for the varying persistency value of color retention in the human eye, *i. e.*, the exposure through the color screen of lowest color persistency being the greater and the exposure through the color screen of highest persistency value being the lesser.

4. In the art of producing animated pictures in color, a film having a continuous sequence of pictures of an object in motion, said pictures being arranged in successive groups of successively taken pictures in straight line sequence, the pictures of each group having the desired cycle of color values therein, the pictures of succeeding groups representing the successive positions of the object and the pictures of each group representing the object without material change in its position.

In testimony whereof I affix my signature in presence of two witnesses.

HENRY WILLIAM JOY.

Witnesses:
 FRANK B. DEHNY,
 ALBERT R. RAMSEY.